Figure 1:
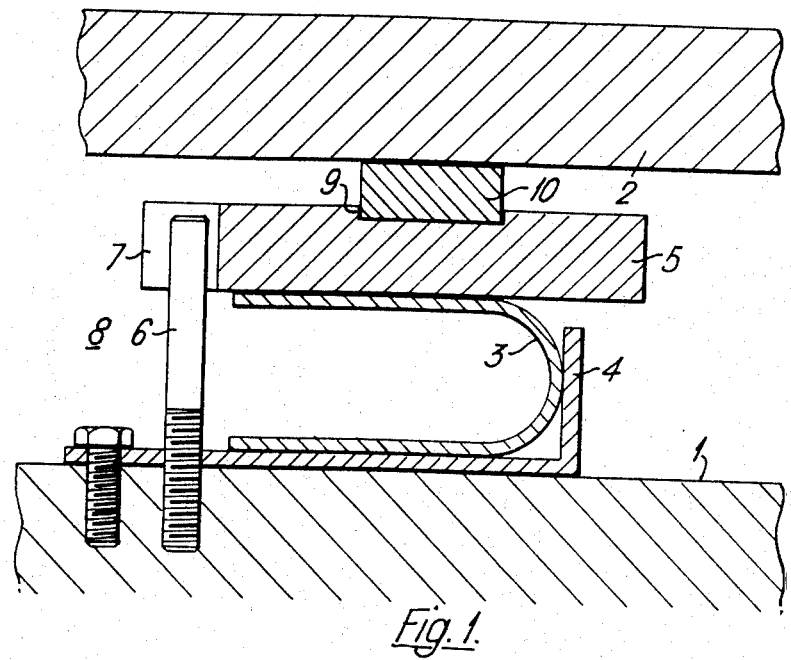

United States Patent
Penny

[15] 3,692,097
[45] Sept. 19, 1972

[54] THERMAL REGENERATORS

[72] Inventor: Robert Noel Penny, Solihull, England

[73] Assignee: Leyland Gas Turbines Limited, Lode Lane, Solihull, Warwick County, England

[22] Filed: Sept. 28, 1970

[21] Appl. No.: 75,887

[30] Foreign Application Priority Data
Nov. 13, 1969  Great Britain .......55,513/69

[52] U.S. Cl. ......................165/9, 277/96, 277/227
[51] Int. Cl. ..............................................F28d 19/04
[58] Field of Search ...............165/9; 277/96, 227, 81

[56] References Cited
UNITED STATES PATENTS 3,401,740  9/1968  Trudeau ....................165/9 X
3,301,317  1/1967  Weaving et al. ............165/9 X
3,192,998  7/1965  Chute ............................165/9
3,234,999  2/1966  Atwood ........................165/9

Primary Examiner—Albert W. Davis, Jr.
Attorney—Holcombe, Wetherill & Brisebois

[57] ABSTRACT

A thermal regenerator of the kind having a rotary disc-type matrix, traversed by segregated flows of heat-exchanging fluids, is equipped with a sealing assembly in which a support of non-metallic refractory material locates and supports a sealing element that makes rubbing contact with the corresponding face of the matrix; the sealing assembly also including a flexible sealing member of thin sheet metal which is designed to be pressed firmly against the support by the pressure-differential of the heat-exchanging fluids.

4 Claims, 2 Drawing Figures

THERMAL REGENERATORS

This invention relates to thermal regenerators (otherwise known as regenerative heat-exchangers) of the kind employing a rotary disc-type matrix.

Thermal regenerators of the kind referred to are usually incorporated in gas turbine power plants to extract heat from the exhaust gases, and to transfer it to the compressed intake-air before this enters the combustion chamber of the gas turbine engine. The rotary disc-type matrix, which is housed in the casing of the engine, comprises a foraminous refractory core (e.g. of ceramic or glass-ceramic material) formed with a multitude of open-ended, thin-walled passages lying substantially parallel to its rotational axis. Sector-like zones of the core are caused (by its rotation) to be presented alternately to the flow of the exhaust gases and to the flow of the compressed intake-air. In that way the required heat transference is effected.

It is, of course, necessary to segregate the two gaseous flows at all times, and to minimize leakage between the high-pressure low-temperature zone, occupied by the compressed intake-air, and the low-pressure high-temperature zone occupied by the exhaust gases. To this end, it is common practice to employ a sealing element that makes rubbing contact with the corresponding face of the matrix, and which is mounted on a flexible member fixed to the casing of the engine. The intended purpose of the flexible mounting is to maintain contact between the matrix face and the counterface of the sealing element, despite the quite considerable differential movements which occur between the engine casing and the matrix at high temperatures. However, attainment of really efficient sealing, under the arduous conditions obtaining, still presents a problem. This would appear to be mainly attributable to the circumstance that, hitherto, the sealing assembly has usually included a metallic support between the sealing counterface and the above-mentioned flexible member. This metallic support is itself subject to thermal distortion relative to the matrix, and consequently engenders leakage between the matrix face and the sealing counterface.

According to this invention a thermal regenerator, of the kind having a rotary disc-type matrix enclosed in a casing which is traversed by two segregated flows of gaseous heat-exchanging fluids, is equipped with a sealing assembly which comprises: a counterface sealing element that makes rubbing contact with the corresponding face of the matrix; a support of non-metallic refractory material that locates and supports the sealing element; and a flexible sealing member of thin sheet metal; this sealing member, which is located on the casing, being designed to be pressed firmly against the support by the pressure-differential of the heat-exchanging fluids.

The invention conduces to more efficient sealing because the counterface sealing element, instead of being mounted directly upon the metallic flexible member, has an intervening support which (being non-metallic) is less subject to thermal distortion.

As the flexible sealing member is metallic, the expansion which it undergoes at the high temperatures involved precludes it from being rigidly attached to the non-metallic support or to the casing. Yet it must unfailingly constitute an effective seal. This requirement is met by the invention in the manner already indicated.

Figure 2:
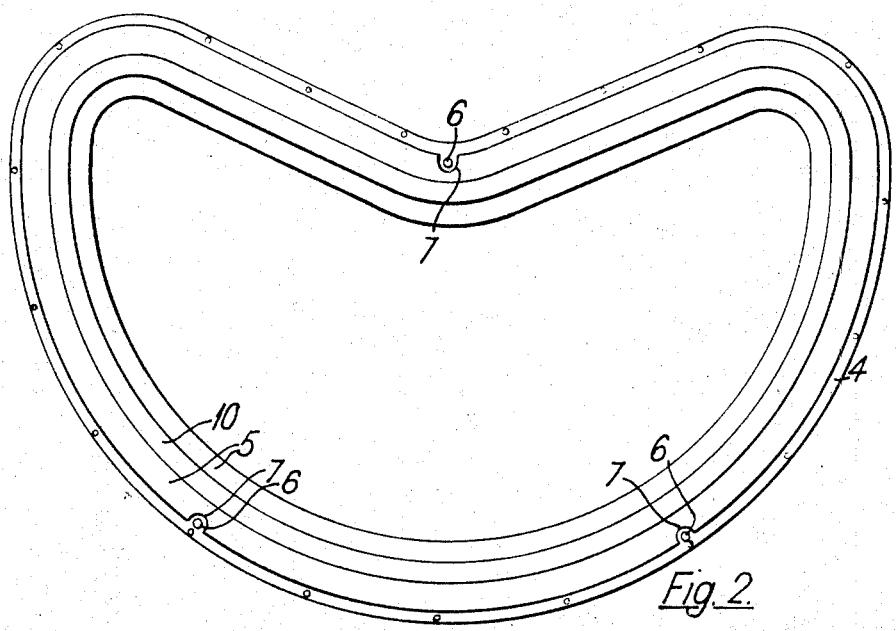

Referring to the accompanying drawings:

FIG. 1 is a schematic fragmentary sectional plan view of a sealing assembly in accordance with the invention, applied to a rotary-disc regenerator of a gas turbine engine; and FIG. 2 is a plan view of the sealing assembly, to a smaller scale.

In the embodiment illustrated, a gas turbine engine has its casing 1 arranged to enclose a rotary disc-type matrix 2 of a thermal regenerator. The latter is equipped with a sealing assembly of which one of the components is a flexible sealing member 3, this member being constituted by very thin sheet metal formed into an annulus of U-shaped cross-section. One side of the annulus 3 is located on the engine casing 1, by means of an L-shaped bracket 4 secured to the casing, and the other side bears against an annular ceramic support 5 which is located with respect to the casing 1 by three pegs 6. The latter are secured to the casing and spaced around the periphery of the support 5 which is slotted at 7 to receive the pegs 6. The mouth of the annulus 3 is open to the high-pressure low-temperature zone 8, traversed by the compressed intake-air before this flows through the regenerator matrix 2.

The annular ceramic support 5 is formed with a channel 9 that locates a counterface sealing element 10 and holds it against the face of the matrix 2.

I claim:

1. In a thermal regenerator of the kind having a rotary disc-type matrix enclosed in a casing which is traversed by two segregated flows of gaseous heat-exchanging fluids, the improved sealing assembly which comprises: a counterface sealing element that makes rubbing contact with the corresponding face of the matrix; a support of non-metallic refractory material between said casing and said sealing element that locates and supports the sealing element; and a flexible sealing member of thin sheet metal which is located on the casing between said casing and support and positioned to be pressed firmly against the support by the pressure-differential of the heat-exchanging fluids.

2. A thermal regenerator according to claim 1, in which the flexible sealing member is constituted by an annulus of U-shaped cross-section.

3. A thermal regenerator according to claim 1, in which the support is constituted by an annulus of ceramic material formed with a channel that locates the counterface sealing element and holds it against the face of the matrix.

4. A thermal regenerator according to claim 1, in which the support has peripheral slots that receive locating pegs secured to the casing.

* * * * *